United States Patent
Freij et al.

(10) Patent No.: US 12,217,059 B1
(45) Date of Patent: Feb. 4, 2025

(54) SYSTEMS AND METHODS FOR PROGRAMMED BRANCH PREDICTORS

(71) Applicant: Advanced Micro Devices, Inc., Santa Clara, CA (US)

(72) Inventors: Alexander Toufic Freij, Austin, TX (US); Gabriel H. Loh, Bellevue, WA (US); Onur Kayiran, Fairpoint, NY (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 120 days.

(21) Appl. No.: 18/193,177

(22) Filed: Mar. 30, 2023

(51) Int. Cl.
*G06F 9/38* (2018.01)
*G06F 9/30* (2018.01)

(52) U.S. Cl.
CPC ........ *G06F 9/30065* (2013.01); *G06F 9/3016* (2013.01)

(58) Field of Classification Search
CPC ............................. G06F 9/30065; G06F 9/3016
See application file for complete search history.

(56) References Cited

U.S. PATENT DOCUMENTS

| | | | | |
|---|---|---|---|---|
| 6,263,428 B1* | 7/2001 | Nonomura | ............ | G06F 9/3844 |
| | | | | 712/239 |
| 6,564,313 B1* | 5/2003 | Kashyap | ................. | G06F 9/381 |
| | | | | 712/E9.058 |
| 8,904,155 B2 | 12/2014 | Dieffenderfer et al. | | |
| 11,132,200 B1* | 9/2021 | Chavan | ................... | G06F 9/381 |
| 2002/0083310 A1* | 6/2002 | Morris | ..................... | G06F 9/325 |
| | | | | 712/233 |
| 2004/0193858 A1* | 9/2004 | Ahmad | ................. | G06F 9/3844 |
| | | | | 712/241 |
| 2004/0237056 A1* | 11/2004 | Okada | ..................... | G06F 30/30 |
| | | | | 716/105 |
| 2007/0186083 A1* | 8/2007 | Vermeire | ................ | G06F 9/325 |
| | | | | 712/E9.055 |
| 2008/0010444 A1* | 1/2008 | Hammes | ............... | G06F 9/3832 |
| | | | | 712/241 |
| 2009/0144502 A1* | 6/2009 | Pechanek | .............. | G06F 9/3842 |
| | | | | 712/241 |
| 2013/0125097 A1* | 5/2013 | Ebcioglu | ............... | G06F 30/323 |
| | | | | 717/136 |
| 2017/0115988 A1* | 4/2017 | Jung | ..................... | G06F 8/4441 |
| 2020/0285477 A1* | 9/2020 | Winrow | ................ | G06F 9/3846 |
| 2021/0200550 A1* | 7/2021 | Sivtsov | ................... | G06F 9/325 |
| 2023/0097983 A1* | 3/2023 | John | ..................... | G06F 21/554 |
| | | | | 714/25 |

(Continued)

OTHER PUBLICATIONS

Khan et al. "Whisper: Profile-Guided Branch Misprediction Elimination for Data Center Applications" Jan. 1, 2022.

(Continued)

*Primary Examiner* — Hyun Nam
(74) *Attorney, Agent, or Firm* — Greenberg Traurig, LLP

(57) ABSTRACT

The disclosed device a controller that sets an iteration counter for a loop based on an iteration value read from a loop iteration instruction for the loop. The controller also updates the iteration counter based on a number of times a loop heading instruction for the loop is decoded. When the iteration counter reaches an end value, the controller selects a not taken identifier for the loop to be fetched, to avoid a branch misprediction. Various other methods, systems, and computer-readable media are also disclosed.

20 Claims, 6 Drawing Sheets

(56) References Cited

U.S. PATENT DOCUMENTS

| | | | |
|---|---|---|---|
| 2023/0130323 A1* | 4/2023 | Chavan | G06F 9/3842 |
| | | | 712/205 |
| 2023/0409325 A1* | 12/2023 | Bolbenes | G06F 9/30036 |
| 2024/0118900 A1* | 4/2024 | Okazaki | G06F 9/3861 |

OTHER PUBLICATIONS

Sherwoood et al., "Loop Termination Prediction," In Proceedings of the 3rd International Symposium on High Performance Computing (ISHPC2K), Oct. 2000.

* cited by examiner

```
int main() {
    int a[10] = {0};
    for (int i = 0; i < 10; i++) {
        a[i] += 1;
    }
}
```

*FIG. 3A*

```
10  .L3:
11      mov     eax, DWORD PTR [rbp-4]
12      cdqe
13      mov     eax, DWORD PTR [rbp-48+rax*4]
14      lea     eax, [rax+1]
15      mov     eax, DWORD PTR [rbp-4]
16      cdqe
17      mov     DWORD PTR [rbp-48+rax*4], edx
18      add     DWORD PTR [rbp-4], 1
19  .L2:
20      cmp     DWORD PTR [rbp-4], 9
21      jle     .L3
22      mov     eax, 0
23      pop     rbp
24      ret
```

*FIG. 3B*

SYSTEMS AND METHODS FOR PROGRAMMED BRANCH PREDICTORS

BACKGROUND

As computing requirements and needs continue to increase, techniques for increasing processing efficiency can provide performance gains. For instance, in an instruction execution pipeline, pre-fetching techniques provide processing efficiencies by reducing potential down time between instruction fetches. More specifically, branch prediction techniques can predict which branch will be taken for a branch instruction to pre-fetch the predicted branch. However, such branch prediction techniques have certain limitation.

BRIEF DESCRIPTION OF THE DRAWINGS

The accompanying drawings illustrate a number of exemplary implementations and are a part of the specification. Together with the following description, these drawings demonstrate and explain various principles of the present disclosure.

FIGS. 3A-B are diagrams of an exemplary loop code.

Figure 1:
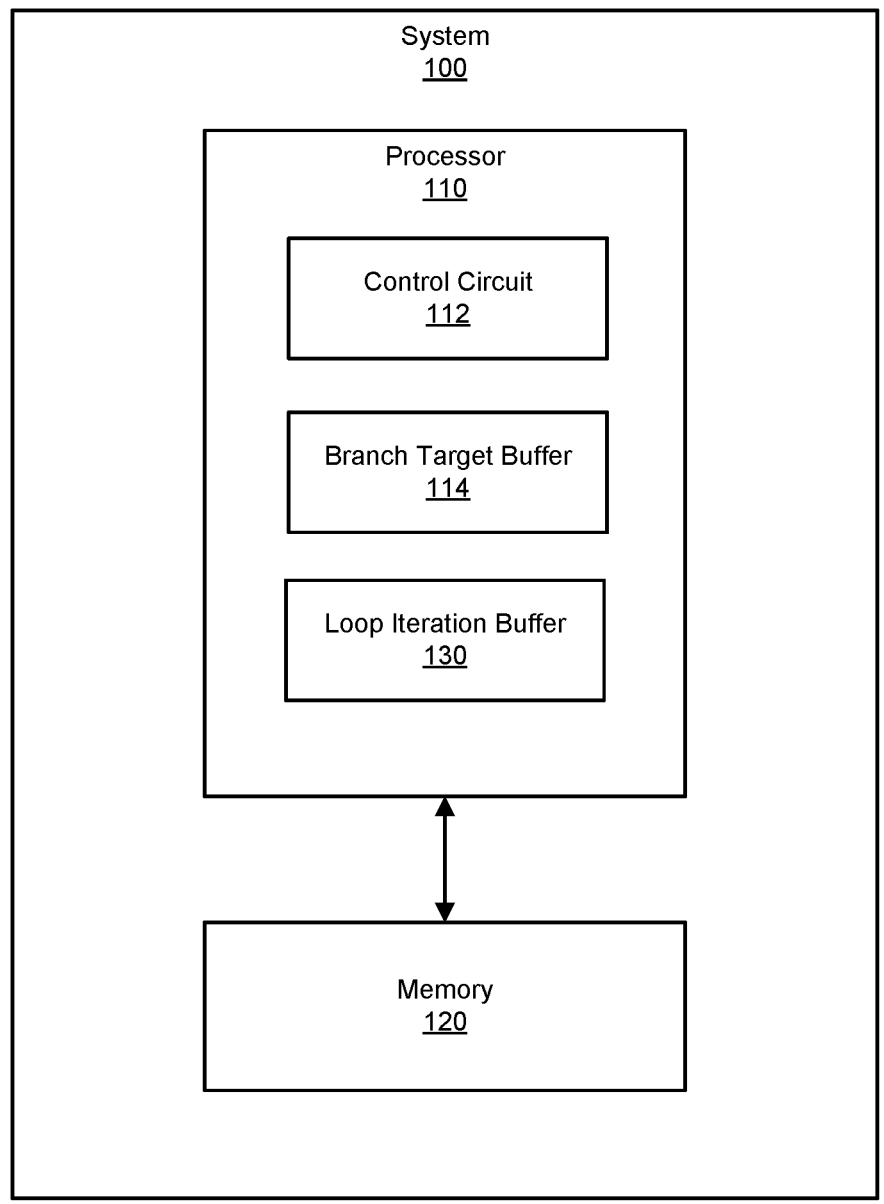
FIG. 1 is a block diagram of an exemplary system for branch predictors for loop termination instructions.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to branch prediction at the end of loops. Because the end of the loop occurs once during loop iteration, branch predictors often fail to distinguish between another iteration of the loop and the end of the loop. Tracking which iteration of the loop is currently being processed can therefore allow the branch predictor to identify when the end of the loop is reached. As will be explained in greater detail below, implementations of the present disclosure provide for identifying an end of a loop (e.g., via programming) for accurate branch prediction. For example, a processor can include an iteration counter for tracking iterations of the loop to identify when the end of the loop is reached. Whereas in previous loop iterations a predicted branch is taken, for the end of the loop an un-taken or not taken branch can be selected, avoiding branch misprediction and associated overhead.

In one implementation, a device for programmed branch predictors includes a controller configured to (i) set an iteration counter for a loop based on an iteration value read from a loop iteration instruction corresponding to the loop, (ii) update the iteration counter based on a number of times a loop heading instruction corresponding to the loop is decoded, and (iii) select, in response to the iteration counter reaching an end value, a not taken identifier for the loop to be fetched.

In some examples, updating the iteration counter further includes updating the iteration counter when the loop heading instruction is decoded. In some examples, updating the iteration counter further includes updating the iteration counter based on a number of times the loop heading instruction was previously decoded. In some examples, updating the iteration counter further includes changing the iteration counter based on a stride value read from the loop iteration instruction.

In some examples, the device further includes a loop iteration buffer, and the controller is configured to create an entry in the loop iteration buffer based on the loop iteration instruction and the entry includes the iteration counter. In some examples, the entry includes a loop identifier corresponding to the loop heading instruction. In some examples, the entry includes a not taken identifier corresponding to a loop end instruction. In some examples, the controller is configured to clear the entry when a taken identifier for the loop and the not taken identifier for the loop have both been decoded. In some examples, the loop iteration buffer corresponds to a circular buffer.

In one implementation, a system for programmed branch predictors includes a physical memory, at least one physical processor, a loop iteration buffer, and a controller. The controller is configured to (i) create an entry in the loop iteration buffer for a loop based on a loop iteration instruction, wherein the entry includes an iteration counter based on an iteration value read from the loop iteration instruction, a loop identifier corresponding to a loop heading instruction for the loop, and a not taken identifier corresponding to a loop end instruction for the loop, (ii) update the iteration counter based on a number of times the loop identifier is decoded, and (iii) select, in response to the iteration counter reaching an end value, the not taken identifier to be fetched.

In some examples, updating the iteration counter further includes updating the iteration counter when the loop identifier is decoded. In some examples, updating the iteration counter further includes updating the iteration counter based on a number of times the loop identifier was previously decoded.

In some examples, the entry further includes a stride value read from the loop iteration instruction, and updating the iteration counter further comprises changing the iteration counter based on the stride value.

In some examples, the entry further includes one or more status values. In some examples, the one or more status values include a taken flag corresponding to whether a predicted branch for the loop has been decoded, and a not taken flag corresponding to whether the not taken identifier has been decoded. In some examples, the controller is configured to clear the entry when the taken flag and the not taken flag are both set. In some examples, the one or more status values includes a valid flag, and the controller is configured to clear the entry by clearing the valid flag.

In some examples, the loop iteration buffer corresponds to a circular buffer. In some examples, creating the entry further comprises updating a tail of the circular buffer with the created entry.

In one example, a method for using programmed branch predictors includes (i) reading a loop iteration instruction for a loop, the loop iteration instruction including an iteration value, (ii) identifying a loop identifier corresponding to a loop heading instruction for the loop, (iii) identifying a not taken identifier corresponding to a loop end instruction for the loop, (iv) creating an entry in a loop iteration buffer, the entry including an iteration counter based on the iteration value, the loop identifier, and the not taken identifier, (v) updating the iteration counter based on a number of times the loop identifier is decoded, and (vi) selecting, in response to the iteration counter reaching an end value, the not taken identifier to be fetched.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-6, detailed descriptions of programmed branch predictors. Detailed descriptions of example systems are provided in connection with FIGS. 1 and 4. Detailed descriptions of example code for a loop are provided in connection with FIGS. 3A-3B. Detailed descriptions of an example processor/instruction pipeline are provided in connection with FIG. 2. Detailed descriptions of an example buffer are provided in connection with FIG. 5. Detailed descriptions of corresponding computer-implemented methods will also be provided in connection with FIG. 6.

FIG. 1 is a block diagram of an example system 100 for programmed branch predictors. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

In some implementations, the term "instruction" refers to computer code that can be read and executed by a processor. Examples of instructions include, without limitation, macro-instructions (e.g., program code that requires a processor to decode into processor instructions that the processor can directly execute) and micro-operations (e.g., low-level processor instructions that can be decoded from a macro-instruction and that form parts of the macro-instruction).

As further illustrated in FIG. 1, processor 110 includes a control circuit 112, a branch target buffer 114, and a loop iteration buffer 130. Control circuit 112 corresponds to a control circuit for managing programmed branch predictors and in some implementations is integrated with and/or corresponds to a branch predictor circuit. A branch predictor circuit can include circuitry for predicting whether a fetched instruction will be decoded into a taken branch (e.g., a branch that has been decoded). Branch target buffer 114 corresponds to a local storage of processor 110 (e.g., of a control circuit 112) for storing taken branches (e.g., program counters thereof). Loop iteration buffer 130 corresponds to a buffer for tracking programmed branch predictors.

Figure 2:
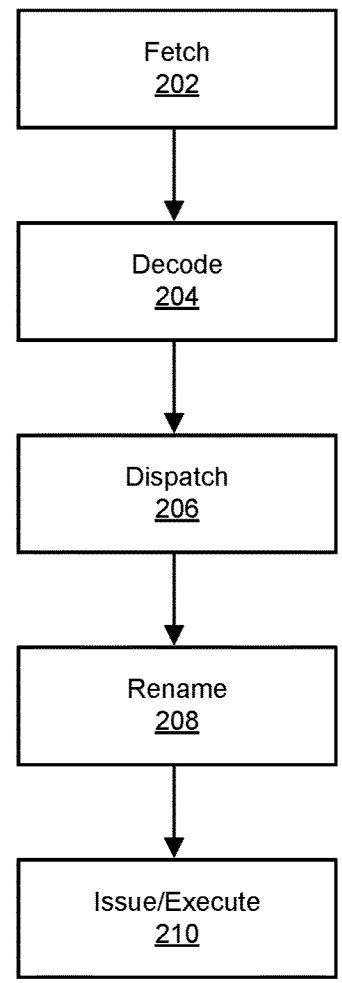
FIG. 2 is a flow diagram of an exemplary instruction pipeline.

FIG. 2 illustrates an exemplary pipeline 200 for a processor, such as processor 110 (and/or a functional unit thereof), for executing instructions. During a fetch stage 202, processor 110 can read program instructions from memory 120. Processor 110 can fetch program instructions based on an active thread or other criteria. At decode stage 204, processor 110 can decode the read program instructions into micro-operations. Processor 110 (and/or a functional unit thereof) can forward the newly decoded micro-operations to a scheduler that can queue micro-operations until they are ready for dispatch. At dispatch stage 206, the scheduler can dispatch one or more micro-operations that are ready for dispatch. At rename stage 208, processor 110 can allocate registers to the dispatched micro-operation as needed. At issue/execute stage 210, processor 110 and/or an execution unit thereof executes the dispatched micro-operations.

Although FIG. 2 illustrates a basic example pipeline 200, in other examples processor 110 can include additional or fewer stages, perform the stages in various orders, repeat iterations, and/or perform stages in parallel. For instance, as an instruction proceeds through the stages, a next instruction can follow so as not to leave a stage inactive. However, certain instructions (e.g., a branch such as a conditional jump instruction) can change the next instruction depending on a result of executing the instruction. For example, a conditional jump can be "taken" such that the next instruction jumps to a different place in program memory. Alternatively, the conditional jump can be "not taken" such that the next instruction continues with the next instruction in the program memory.

FIG. 3A illustrates example source code for a loop that includes a branch. Code 300 in FIG. 3A includes a for loop with a defined number of iterations (e.g., 10 iterations as i iterates from 0 to 9, and exiting the loop when i is 10). FIG. 3B illustrates corresponding assembly code 301 for code 300. As illustrated in FIG. 3B, assembly code 301 includes a branch 335, a taken branch 336, and a not taken branch 338. Branch 335 includes a conditional corresponding to an end of the loop. When the loop does not end, taken branch 336 jumps the next instruction to elsewhere in the program memory, specifically to the instruction corresponding to line 11. When the loop ends, not taken branch 338 sets the next instruction as the next instruction in program memory.

Because the next instruction is unknown until branch 335 is executed (e.g., evaluating the conditional at issue/execute stage 210), processor 110 can be delayed in entering the next instruction into the pipeline (e.g., fetch stage 202). Thus, the stages between fetch stage 202 and issue/execute stage 210 can remain idle. To prevent this wait, processor 110 can include a branch predictor (e.g., control circuit 112), to predict whether the branch will be taken (e.g., selecting taken branch 336 for fetching) or not taken (e.g., selecting not taken branch 338 for fetching). Processor 110 can fetch the next instruction as predicted by the branch predictor.

Figure 4:
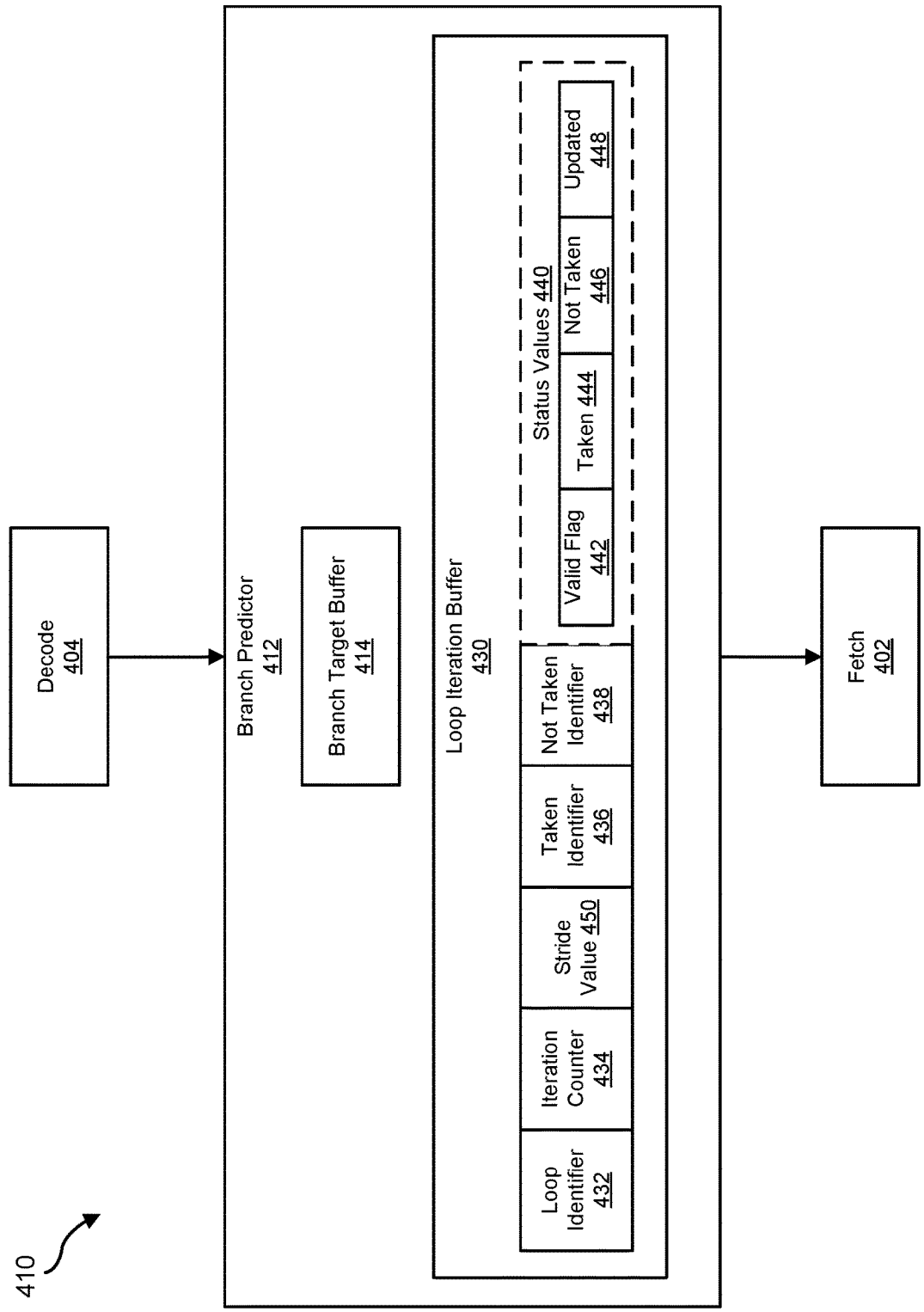
FIG. 4 is a block diagram of an exemplary buffer structure for branch predictors for loop termination instructions.

FIG. 4 illustrates a processor 410 corresponding to processor 110. Processor 410 includes a decode stage 404 corresponding to decode stage 204, a branch predictor 412 corresponding to control circuit 112, and a fetch stage 402 corresponding to fetch stage 202. Branch predictor 412 also includes a branch target buffer 414 corresponding to branch target buffer 114. Branch target buffer 414 can be used by branch predictor 412 to predict a target of a predicted branch, for example having decoded instructions of a taken branch. In some examples, branch target buffer 414 and/or another buffer of branch predictor 412 can further track a number of times a branch was taken, to aid in future branch predictions. Based on the prediction, branch predictor 412 can accordingly instruct fetch stage 402 to enter the predicted next instruction into the pipeline.

A branch misprediction (e.g., predicting the wrong next instruction) can incur overhead, for instance requiring the stages for the erroneous instruction to be flushed and fetching the correct next instruction, which wastes a number of cycles corresponding to flushed stages. However, certain branches can be accurately predicted if branch predictor 412 is provided additional information. A for loop or similar loop, having a deterministic end condition without break out conditions can have accurately predicted branches if a number of iterations is known. For example, returning to FIGS. 3A-3B, the illustrated loop iterates 10 times before exiting. In other words, for branch 335, taken branch 336 will be executed 10 times until not taken branch 338 is executed. The systems and methods described herein allow branch predictor 412 to track such iterations.

As illustrated in FIG. 4, branch predictor 412 can include a loop iteration buffer 430 corresponding to loop iteration buffer 130. In some implementations, loop iteration buffer 430 can be a part of branch target buffer 414 or another buffer accessible to branch predictor 412. Each entry in loop iteration buffer 430, which corresponds to a loop, includes a loop identifier 432, an iteration counter 434, a stride value 450, a taken branch 436, and a not taken branch 438. In some implementations, each entry can include status values 440. For example, status values 440 can include a valid flag 442, a taken flag 444, a not taken flag 446, and an updated flag 448.

In some implementations, branch predictor 412 can create an entry for a loop in loop iteration buffer 430 in response to an iteration instruction corresponding to the loop. In some examples, the iteration instruction can be programmed or otherwise inserted into a program. For instance, in FIG. 3A, a programmer can insert a special command (e.g., a pragma) identifying the loop and its iterations. Alternatively, a compiler can identify the loop and its iterations and insert the iteration instruction. When branch predictor 412 encounters the iteration instruction, branch predictor 412 can create an entry and store the associated information.

The iteration instruction can identify the loop, for example a loop heading instruction corresponding to either a start of the loop or the branch (e.g., branch 335). Branch predictor 412 can store loop identifier 432, which can be a program counter (PC) or other identifier of branch 335.

The iteration instruction can also include a value for iteration counter 434 that tracks how many iterations have been performed and/or are to be performed, to accurately predict reaching the end of the loop. In FIG. 3A, the loop iteration command or the compiler can designate 10 or a variable having an iteration count value (to be determined at run time). Although FIGS. 3A and 3B illustrate an index i being incremented by 1 (e.g., a stride value of 1), in other examples, the stride value can be different, for instance 2 such that the iteration count value is updated by 2 for each iteration. In such examples, the iteration instruction can also include stride value 450. In yet other examples, the stride value can be incorporated into iteration counter 434, such as by dividing an iteration end value by the stride value.

In some examples, iteration counter 434 can be stored as a number of iterations left to perform such that iteration counter 434 is decremented by the stride value (e.g., 1 if none is provided) and an end value corresponds to 0. In other examples, iteration counter 434 can start at 0 and be incremented by stride value 450 until reaching an end value (e.g., 10 for the loop in FIG. 3A). Each time loop identifier 432 is decoded, branch predictor 412 can accordingly update iteration counter 434 to reflect the iteration, such that branch predictor 412 can update iteration counter 434 based on a number of times loop identifier 432 is decoded.

In some examples, branch predictor 412 can encounter the iteration instruction after the loop has been iterated one or more times, such as when instructions are decoded out of order. To manage this scenario, updated flag 448 can be set to valid indicate that iteration counter 434 should be updated for a number of times the loop has iterated (e.g., a number of times the loop heading instruction has been decoded). Branch target buffer 414 or other buffer can include decoded entries such that the number of times the loop heading instruction has been previously decoded can be counted. Branch predictor 412 can accordingly update (e.g., by subtracting and/or adding the stride value times the number of performed iterations) iteration counter 434. Branch predictor 412 can clear update flag 448 if iteration counter 434 does not need to be updated for previous iterations performed.

Taken identifier 436 can correspond to a PC or other identifier of the instruction when the branch is taken (e.g., to perform another iteration of the loop). If iteration counter 434 does not reach the appropriate end value, branch predictor 412 can select taken identifier 436 for fetching (e.g., by fetch stage 402).

Not taken identifier 438 can correspond to a PC or other identifier of the instruction when the branch is not taken (e.g., the end of the loop). If iteration counter 434 does reach the appropriate end value, branch predictor 412 can select not taken identifier 438 for fetching (e.g., by fetch stage 402).

Status values 440 can include one or more status values/flags for the loop corresponding to the entry. For example, valid flag 442 can indicate whether the corresponding entry is valid or not valid (e.g., can be deleted). The entry can be deleted when both taken identifier 436 and not taken identifier 438 have been decoded. Taken flag 444 can track whether taken identifier 436 has been decoded (e.g., setting taken flag 444 when taken identifier 436 has been decoded at least once) and not taken flag 446 can track whether not taken identifier 438 has been decoded (e.g., setting not taken flag 446 when not taken identifier 438 has been decoded at least once). Thus, when both taken flag 444 and not taken flag 446 are set, valid flag 442 can be cleared such that the entry can be deleted.

In some examples, a size of loop iteration buffer 430 is limited such that a number of entries held in loop iteration buffer 430 is limited. The number of loops tracked concurrently can therefore be limited to the number of entries.

Figure 5:
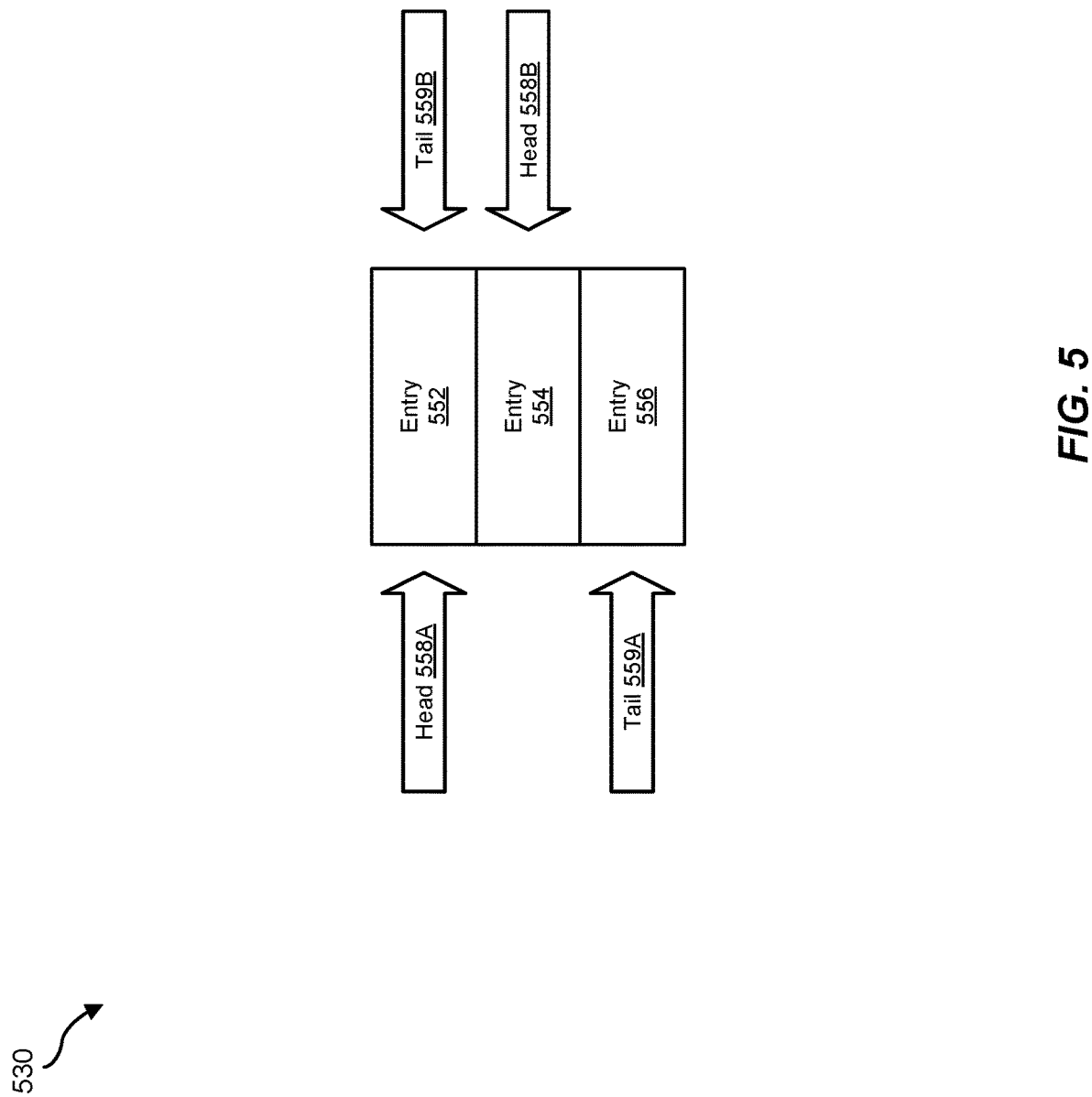
FIG. 5 is a diagram of an exemplary circular buffer for branch predictors for loop termination instructions.

Concurrent loops can correspond to, for example, loops processed in parallel, nested loops, etc. In some examples, loop iteration buffer 430 can maintain its entries (e.g., holding the oldest loops) until they can be deleted (e.g., valid flag 442 is cleared) before adding new entries by replacing stale entries. However, in some cases, holding the oldest loops can be undesirable. For instance, in a nested loop, tracking the inner most loop (e.g., newest loop) would be more beneficial than tracking the outer most loop (e.g., oldest loop). Thus, in other examples, branch predictor 412 can manage loop iteration buffer 430 by evicting one or more entries before they are ready for deletion, to make room for one or more new entries. For example, branch predictor 412 can evict entries based on iteration counter 434 (e.g., evicting the most iterations left or the least iterations left, and/or based on other factors and/or status values 440). FIG. 5 illustrates a circular buffer as another buffer management scheme for branch predictor 412.

FIG. 5 illustrates a loop iteration buffer 530 that corresponds to loop iteration buffer 430. Loop iteration buffer 530 is limited to three entries, an entry 552, an entry 554, and an entry 556, each of which corresponding to separate instances of a loop entry (e.g., the entry in loop iteration buffer 430). Moreover, loop iteration buffer 530 is a circular buffer having a head (e.g., a head 558A and/or a head 558B) and a tail (e.g. a tail 559A and/or a tail 559B). Head 558A and/or head 558B correspond to the head of the circular buffer (e.g., a first entry which can also be an oldest entry). Tail 559A and/or tail 559B correspond to the tail of the circular buffer (e.g., a last entry which can also be the newest entry).

In a first scenario, head 558A points to entry 552 and tail 559A points to entry 556 corresponding to, for instance, when loop iteration buffer 530 started from empty and filled sequentially with three entries (e.g., starting from entry 552). In some examples, this scenario corresponds to a nested loop having gone three levels deep, with entry 552 corresponding to the outermost loop and entry 556 corresponding to the innermost loop. If this nested loop has another nested loop (e.g., 4 levels deep), loop iteration buffer 530 lacks space for an additional entry. In some examples, it can be more desirable to keep newer entries rather than older entries, because newer entries correspond to loops that are more currently iterated. In addition, in a nested loop, the deeper loop can cause more branch mispredictions due to the outer loop reiterating through an inner loop for the outer loop's next iteration.

With the circular buffer structure, a new entry can be added by updating the tail (e.g., to the next entry after the previous tail, circling back to the beginning of the buffer as needed), adding the new entry to the new tail, and updating the head (e.g., to the next entry after the previous head if the new tail coincides with the previous head and circling back to the beginning of the buffer as needed). Thus, in a second scenario in which a new entry is added to loop iteration buffer 530 in the first scenario, the head is updated to head 558B (e.g., pointing to entry 554) and the tail is updated to tail 559B (e.g., pointing to entry 552). Thus, entry 554 corresponds to the outermost loop being tracked, and entry 552 corresponds to the innermost loop. As entries are cleared/deleted the head and tail can be appropriately updated (e.g., by moving the tail to the previous entry and circling around to the end of the buffer as needed).

Figure 6:
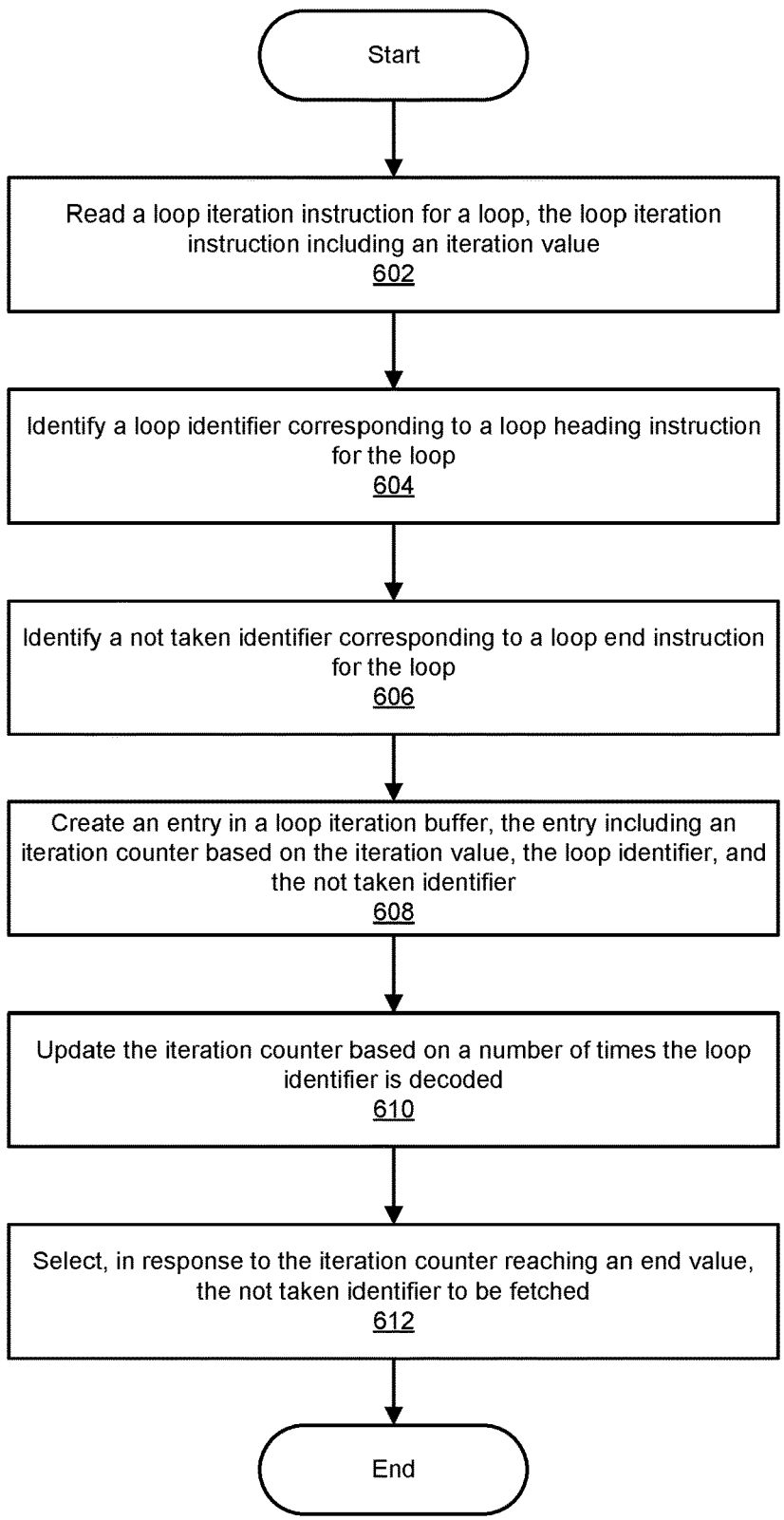
FIG. 6 is a flow diagram of an exemplary method for branch prediction for loop termination instructions.

FIG. 6 is a flow diagram of an exemplary computer-implemented method 600 for using programmed branch predictors. The steps shown in FIG. 6 can be performed by any suitable circuit, computer-executable code and/or computing system, including the system(s) illustrated in FIGS. 1 and/or 4. In one example, each of the steps shown in FIG. 6 represent an algorithm whose structure includes and/or is represented by multiple sub-steps, examples of which will be provided in greater detail below.

As illustrated in FIG. 6, at step 602 one or more of the systems described herein read a loop iteration instruction for a loop, the loop iteration instruction including an iteration value. For example, control circuit 112 can read a loop iteration instruction for a loop, including reading an iteration value for the loop.

At step 604 one or more of the systems described herein identify a loop identifier corresponding to a loop heading instruction for the loop. For example, control circuit 112 can identify a loop identifier by reading the loop identifier from the loop iteration instruction.

At step 606 one or more of the systems described herein identify a not taken identifier corresponding to a loop end instruction for the loop. For example, control circuit 112 can read a not taken identifier from the loop iteration instruction.

At step 608 one or more of the systems described herein create an entry in a loop iteration buffer, the entry including an iteration counter based on the iteration value, the loop identifier, and the not taken identifier. For example, control circuit 112 can create an entry in loop iteration buffer 130 including an iteration counter based on the iteration value (e.g., incorporating a stride value as needed), the loop identifier, and the not taken identifier. In some examples, control circuit 112 can include additional values in the entry, such as a taken identifier, and one or more status values as described herein.

At step 610 one or more of the systems described herein update the iteration counter based on a number of times the loop identifier is decoded. For example, control circuit 112 can update the iteration counter in the corresponding entry in loop iteration buffer 130 based on a number of time the loop identifier is decoded. In some examples, the iteration counter can be updated using a stride value for each iteration count.

At step 612 one or more of the systems described herein select, in response to the iteration counter reaching an end value, the not taken identifier to be fetched. For example, control circuit 112 can select the not taken identifier to be fetched when the iteration counter reaches an appropriate end value for the loop, as described herein.

As detailed above, branch prediction at the end of loops (i.e.: for loops) can incur expensive branch misprediction recovery in the CPU pipeline. With a known iteration count, these branch mispredictions can be mitigated if the branch predictor (BP) had prior knowledge (at run time or compiler time) of the iteration count to not predict the branch based on the branch's pattern history. The systems and methods described herein provide an instruction and hardware structures that assist the branch in knowing the iteration count of loops to avoid costly branch misprediction on easy-to-detect branches.

Branch misprediction recovery is invoked when a mispredicted branch is committed, flushing all speculative instructions executed after the branch. While necessary, this process can harm performance and consume significant power. For certain branches, such as those at the end of for loops, the branch misprediction can be easily avoided if the BP had prior knowledge of how many iterations of the loop are due to execute. By knowing the iteration count, the BP can ignore the prediction based on the branch's pattern history and instead begin fetching and executing instructions down the correct path.

In some implementations, a hardware-software co-design can mitigate easy-to-predict branches for for-loops with a deterministic iteration condition variable either at compile or runtime. Some implementations include an updated software design and a single hardware structure that can be stand-alone or incorporated with the branch target buffer (BTB).

The software mechanism to support the hardware can include a new instruction to be introduced into an instruction set architecture (ISA). This instruction can pass the loop-identifying PC and a loop iteration count through the decode stage of the pipeline. This instruction can contain the PC of the branch that indicates the first instruction of the for loop or the branch at the end of the for loop and the loop condition as a plaintext value, in some examples. This instruction can be introduced into the pipeline in multiple ways, such as a programmer-based approach or compiler assisted approach.

The programmer-based involves adding a pragma or an intrinsic into the source code to indicate that the following loop can be optimized using the hardware detailed above. To ensure that this optimization is available, (1) the iteration count should be known at compile time or can be determined at runtime before the loop begins execution, (2) there are no conditional loop exits, and (3) there are no modifications to the loop iteration counter within the loop body. To use a pragma, the compiler can be modified to be able to automatically detect the loop condition. A programmer-added intrinsic can be more suitable to minimize the compiler modifications, as it allows a simpler approach when passing a value or variable. The pragma can include a hard-coded value or pass in a variable that will have a value set during runtime. Both approaches can allow flexibility to a programmer with full understanding of the source code and the optimization available to them and in some cases relies on the programmer ensuring that no changes to the condition variable or any loops invoke a break condition. The compiler-assisted approach can remove this burden from the programmer and instead performs static code analysis to determine if there are any conditional breaks in the loop or changes to the condition variable.

The branch prediction mechanism requires additional hardware support to be made aware of the iteration count of the loop. The hardware fields detailed herein can be incorporated into the branch target buffer (BTB) or in a separate buffer (e.g., a loop iteration buffer as detailed above).

There can be two scenarios for the instruction decoding sequence when passing the loop iteration count to the branch predictor. First, if the loop iteration instruction is decoded before the beginning of the loop, a new entry is created in the loop iteration buffer and the iteration count is set. The iteration counter is decremented when the PC for the corresponding loop heading is decoded. When the counter reaches 0, the PC of the inverse of the prediction (e.g., not taken) is passed back to the fetch stage to begin fetching instructions from the correct path and the instructions in the decode stage are squashed. The other scenario occurs if the loop header began execution before the loop iteration instruction is fetched and updates the entry in the loop iteration buffer. In this scenario, the branch predictor would need to be made aware of the number of iterations that have already been decoded and begun execution. In this scenario, the loop header can create an entry in the loop iteration buffer, begin incrementing the iteration counter, but not set the updated flag. Once the loop iteration instruction has been decoded, a matching PC is found in the buffer, and existing entry count is decremented from the iteration counter that is part of the instruction and the updated flag is set. From that point, the counter is decremented once the PC is detected in future fetch bundles. Alternatively, comparators to modify the counter can also be used.

The finite capacity of the loop iteration buffer can introduce a corner case as to the write mechanism. For a loop iteration buffer capacity of 3 for a new entry (e.g., a fourth entry), this can either overwrite the oldest entry in the buffer or not write to the buffer because of no capacity. There are performance and complexity aspects to both approaches. First, if the oldest buffer entry is overwritten, branch mispredictions on the most frequently executed branch can be prevented, reaping the most performance benefits. A circular buffer can be used to implement this scheme, as detailed above. Not overwriting entries can reduce the complexity but in some instances can also reduce the performance benefit, as the outer most loop would be executed the least frequently and the adjusted prediction to exit cleanly would only be needed once.

Due to the finite size of the buffer, entries must be cleaned up properly to allow for future entries to be created without introducing unnecessary overhead. A self-cleanup mechanism can be implemented in some examples by adding two 1-bit fields, "taken" and "not taken." When both of these bits are set, this indicates that the entry has been fully utilized (e.g., both paths of a branch have been predicted), thus allowing the entry to be retired by simply invalidating the entry.

The systems and methods provided herein allows dynamically determining the loop condition variable, unlike only static compiler passes. The introduction a loop iteration instruction allows a straightforward implementation that enables both runtime and compile-time loop conditions to be used to reduce the impact of these known branches. While these branches are easy to predict from a programmer's perspective, the hardware does not have the knowledge of when loops are bound to end, which is addressed by the systems and methods described herein.

As detailed above, the circuits, computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
a controller configured to:
set an iteration counter for a loop based on an iteration value read from a loop iteration instruction corresponding to the loop;
update the iteration counter based on a number of times a loop heading instruction corresponding to the loop is decoded; and
select, in response to the iteration counter reaching an end value, a not taken identifier for the loop to be fetched.

2. The device of claim 1, wherein updating the iteration counter further comprises updating the iteration counter when the loop heading instruction is decoded.

3. The device of claim 1, wherein updating the iteration counter further comprises updating the iteration counter based on a number of times the loop heading instruction was previously decoded.

4. The device of claim 1, wherein updating the iteration counter further comprises changing the iteration counter based on a stride value read from the loop iteration instruction.

5. The device of claim 1, further comprising a loop iteration buffer, and wherein the controller is configured to create an entry in the loop iteration buffer based on the loop iteration instruction and the entry includes the iteration counter.

6. The device of claim 5, wherein the entry includes a loop identifier corresponding to the loop heading instruction.

7. The device of claim 5, wherein the entry includes a not taken identifier corresponding to a loop end instruction.

8. The device of claim 7, wherein the controller is configured to clear the entry when a taken identifier for the loop and the not taken identifier for the loop have both been decoded.

9. The device of claim 5, wherein the loop iteration buffer corresponds to a circular buffer.

10. A system comprising:
a physical memory;
at least one physical processor;
a loop iteration buffer; and
a controller configured to:
create an entry in the loop iteration buffer for a loop based on a loop iteration instruction, wherein the entry includes an iteration counter based on an iteration value read from the loop iteration instruction, a loop identifier corresponding to a loop heading instruction for the loop, and a not taken identifier corresponding to a loop end instruction for the loop;
update the iteration counter based on a number of times the loop identifier is decoded; and
select, in response to the iteration counter reaching an end value, the not taken identifier to be fetched.

11. The system of claim 10, wherein updating the iteration counter further comprises updating the iteration counter when the loop identifier is decoded.

12. The system of claim 10, wherein updating the iteration counter further comprises updating the iteration counter based on a number of times the loop identifier was previously decoded.

13. The system of claim 10, wherein the entry further includes a stride value read from the loop iteration instruction, and updating the iteration counter further comprises changing the iteration counter based on the stride value.

14. The system of claim 10, wherein the entry further includes one or more status values.

15. The system of claim 14, wherein the one or more status values include a taken flag corresponding to whether a predicted branch for the loop has been decoded, and a not taken flag corresponding to whether the not taken identifier has been decoded.

16. The system of claim 15, wherein the controller is configured to clear the entry when the taken flag and the not taken flag are both set.

17. The system of claim 15, wherein the one or more status values includes a valid flag, and the controller is configured to clear the entry by clearing the valid flag.

18. The system of claim 10, wherein the loop iteration buffer corresponds to a circular buffer.

19. The system of claim 18, wherein creating the entry further comprises updating a tail of the circular buffer with the created entry.

20. A method comprising:
reading a loop iteration instruction for a loop, the loop iteration instruction including an iteration value;

identifying a loop identifier corresponding to a loop heading instruction for the loop;
identifying a not taken identifier corresponding to a loop end instruction for the loop;
creating an entry in a loop iteration buffer, the entry including an iteration counter based on the iteration value, the loop identifier, and the not taken identifier;
updating the iteration counter based on a number of times the loop identifier is decoded; and
selecting, in response to the iteration counter reaching an end value, the not taken identifier to be fetched.

\* \* \* \* \*